United States Patent [19]

Strumolo et al.

[11] Patent Number: 5,729,670
[45] Date of Patent: Mar. 17, 1998

[54] METHOD FOR PRODUCING A MESH OF QUADRILATERAL/HEXAHEDRAL ELEMENTS FOR A BODY TO BE ANALYZED USING FINITE ELEMENT ANALYSIS

[75] Inventors: Gary Steven Strumolo, Beverly Hills; Nagendra Palle, Ann Arbor, both of Mich.

[73] Assignee: Ford Global Technologies, Inc., Dearborn, Mich.

[21] Appl. No.: 586,533

[22] Filed: Jan. 16, 1996

[51] Int. Cl.⁶ ............................................. G06T 17/20
[52] U.S. Cl. ................................... 395/123; 395/120
[58] Field of Search ................................. 395/119, 120, 395/123, 124; 364/578, 570, 512, 735, 736

[56] References Cited

U.S. PATENT DOCUMENTS

| | | | |
|---|---|---|---|
| 5,125,038 | 6/1992 | Meshkat et al. | 382/22 |
| 5,214,752 | 5/1993 | Meshkat et al. | 395/123 |
| 5,255,212 | 10/1993 | Kondoh et al. | 364/578 |
| 5,315,537 | 5/1994 | Blacker | 364/570 |
| 5,442,569 | 8/1995 | Osano | 364/578 |
| 5,522,019 | 5/1996 | Bala et al. | 395/124 |
| 5,553,206 | 9/1996 | Meshkat | 395/123 |

OTHER PUBLICATIONS

Stephenson et al., "Using Conjoint Meshing Primitives to Generate Quadrilateral and Hexahedral Elements in Irregular Regions," Reprinted From Computers in Engineering Edited by Riley et al., Book No. G0502B—1989, pp. 163–172.

Peraire et al., "Numerical Grid Generation," von Karman Institute for Fluid Dynamics Lecture Series 1990–06, pp. 1–10, 119–121, Jun. 11–15, 1990.

*Primary Examiner*—Phu K. Nguyen
*Assistant Examiner*—Cliff N. Vo
*Attorney, Agent, or Firm*—Roger L. May; Donald A. Wilkinson

[57] ABSTRACT

Meshes for finite element analysis are formed by characterizing two or three dimensional bodies as passages for fluid flow. For a two dimensional body, the body perimeter is discretized and two portions of the perimeter are selected as inlet and outlet ends; the remainder serves as solid walls through which fluid cannot flow. A potential flow problem is solved for streamlines extending from inlet nodes to the outlet. Intersections of grid lines and streamlines determine interior inlet nodes on the surface. Quadrilaterals covering the surface are formed by connecting the nodes. For a three dimensional body, bounding surfaces are selected: one of the surfaces being an inlet surface and another of the surfaces being an outlet surface. The inlet is processed as described. A three dimensional potential flow problem from the inlet to the outlet is then solved. A series of grid planes are formed generally transverse to the three dimensional streamlines and progressing from the inlet to the outlet. The point of intersection of each streamline with the grid planes define flow nodes. For three dimensional meshes, neighboring nodes are connected to form quadrilaterals on each grid plane and these quadrilaterals are connected to quadrilaterals on neighboring grid planes to form hexahedra until the entire three dimensional body is filled.

3 Claims, 4 Drawing Sheets

106

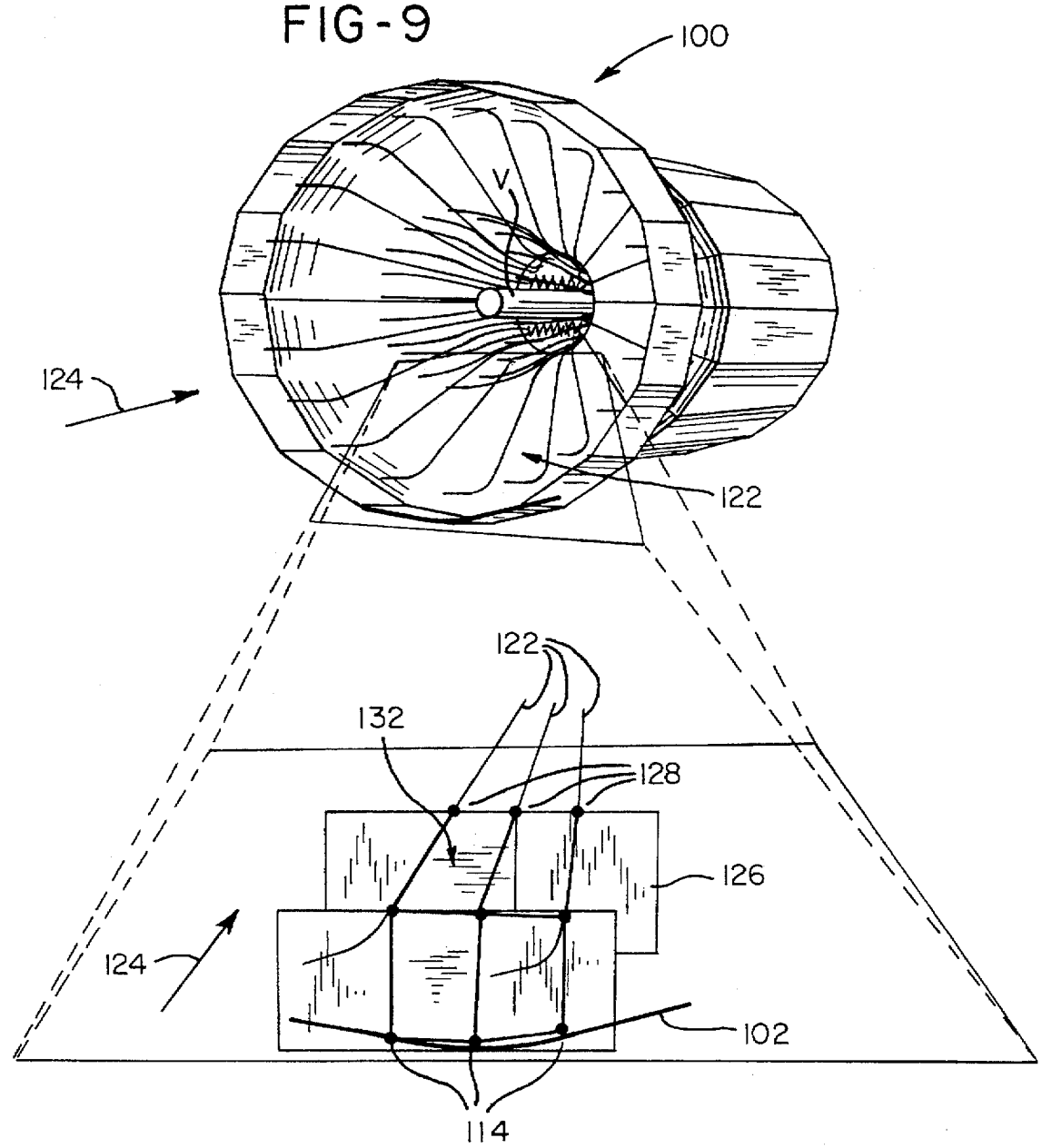

METHOD FOR PRODUCING A MESH OF QUADRILATERAL/HEXAHEDRAL ELEMENTS FOR A BODY TO BE ANALYZED USING FINITE ELEMENT ANALYSIS

BACKGROUND OF THE INVENTION

The present invention relates in general to computer modeling of objects through the use of finite element analysis and, more particularly, to the generation of quadrilateral/hexahedral finite elements using an improved mesh generation method.

Finite element analysis (FEA) is widely used as a computer aided tool for solving design problems governed by partial differential equations. Such analyses determine how a body will react to heat transfer, stress, vibration and the like. FEA is particularly important when the shape of a body to be analyzed is particularly complex such that the differential equations defining such reactions quickly become very difficult to solve analytically or even to approximate.

An initial stage of a finite element analysis requires the production of a mesh of points that are interconnected and become vertices of finite elements either on the boundary and interior for a two dimensional analysis or on the surface and throughout the body for a three dimensional analysis. In the past, the generation of a quadrilateral/hexahedral based mesh suitable for FEA has been one of the most time consuming steps. This is particularly true for three dimensional analyses where much of the previous work has been performed by trial and error with significant manual interaction between the user and the maps of mesh points with subsequent manual corrections of the maps as the analyses progress.

Accordingly, there is a need for a method for automatically producing a mesh of elements for a two or three dimensional body to be analyzed using FEA which would substantially reduce the manual efforts previously required. Preferably, such elements would be quadrilateral for two dimensional bodies and hexahedral for three dimensional bodies.

SUMMARY OF THE INVENTION

This need is met by the invention of the present application wherein mesh generation is performed for a two or three dimensional body by characterizing the body as a passage through which fluid flows. The body is partitioned so as to define inlet and outlet portions or surfaces. For a two dimensional body, the perimeter of the body is discretized. First and second portions of the perimeter of the body are selected as inlet and outlet ends with the portions of the perimeter extending between the inlet end and the outlet end serving as solid walls across which fluid flow is not possible. A potential flow problem is then solved using only this boundary information with the boundary element method (BEM) to determine streamlines extending from nodes on the inlet end to the outlet end of the body. A series of grid lines are then formed generally perpendicular to the streamlines with the grid lines being progressively spaced from the inlet end to the outlet end. The points of intersection of the grid lines with the streamlines determine interior inlet nodes on the two dimensional surface. Quadrilaterals covering the two dimensional surface are then formed by connecting the nodes.

For a three dimensional body, bounding surfaces are selected with one of the bounding surfaces being further defined as an inlet bounding surface and another one of the bounding surfaces being defined as an outlet bounding surface. The inlet bounding surface is processed as just described to be partitioned into quadrilateral mesh elements by connecting the nodes on the inlet bounding surface. A three dimensional potential flow problem from the inlet bounding surface to the outlet surface is next solved using the boundary element method (BEM). Each node on the inlet bounding surface has a three dimensional streamline associated with it with regard to flow through the three dimensional body.

A series of grid planes, which in effect are translations of the inlet bounding surface along the streamlines, are then formed generally transverse to the three dimensional streamlines and progressively spaced from the inlet bounding surface to the outlet bounding surface. After the grid planes have been determined, the point of intersection of each streamline with the grid planes can be located by traversing along the streamlines. These points of intersection define flow nodes. For three dimensional mesh generation, hexahedra are built by connecting neighboring nodes to form quadrilaterals on each grid plane and these quadrilaterals are connected to quadrilaterals on neighboring grid planes via the streamlines to form hexahedra. This hexahedra forming procedure is continued until the entire three dimensional body is filled with hexahedra.

In accordance with one aspect of the present invention, a method for producing a mesh of hexahedral elements for a body to be analyzed using FEA comprises the steps of: generating a solid model of a body to be analyzed; defining bounding surfaces of the body; selecting an inlet surface and an outlet surface from the bounding surfaces for the body; discretizing edges of the inlet surface of the body; assigning an inlet end and an outlet end for the inlet surface; solving for the potential flow from the inlet end to the outlet end for the inlet surface; computing inlet streamlines for potential flows from the inlet end to the outlet end for the inlet surface; defining a series of inlet grid lines which are generally transverse to the inlet streamlines and progressively spaced from the inlet end of the inlet surface to the outlet end of the inlet surface; defining inlet nodes where the grid lines intersect the inlet streamlines and the edges of the inlet surface outside of the inlet end of the inlet surface; building quadrilaterals by connecting the inlet nodes to one another; solving for the potential flow from the inlet surface to the outlet surface for the body; computing solid streamlines for potential flows from the inlet nodes of the inlet surface to the outlet surface; defining a series of grid planes which are generally transverse to the solid streamlines and progressively spaced from the inlet surface to the outlet surface; defining flow nodes where the solid streamlines intersect the grid planes and the outlet surface; and, connecting the inlet nodes and the flow nodes to define hexahedra elements for the body.

In accordance with another aspect of the present invention, a method for producing a mesh of elements for a body to be analyzed using FEA comprises the steps of: generating a model of a body to be analyzed, the body having at least one surface; discretizing edges of the at least one surface; assigning an inlet end and outlet end for the at least one surface; solving for the potential flow from the inlet end to the outlet end for the at least one surface; computing two dimensional streamlines for potential flows from the inlet end to the outlet end for the at least one surface; defining a series of grid lines which are generally transverse to the two dimensional streamlines and progressively spaced from the inlet end of the at least one surface to the outlet end of the at least one surface; defining nodes where the grid lines intersect the two dimensional streamlines and the edges of the at least one surface outside of the inlet end of the at least one surface; and, building quadrilaterals by connecting the nodes to one another.

It is, thus, a feature of the present invention to provide a method for automatically producing a mesh of elements for a two or three dimensional body to be analyzed using FEA which substantially reduces the manual efforts previously required; to provide a method for automatically producing a mesh of elements for a two or three dimensional body to be analyzed using FEA by means of flow analysis; and, to provide a method for automatically producing a mesh of elements for a two or three dimensional body to be analyzed using FEA wherein streamlines from flow analysis and grid lines or planes formed to intersect the streamlines define nodes which are interconnected to define quadrilaterals or hexahedrals.

Other features and advantages of the invention will be apparent from the following description, the accompanying drawings and the appended claims.

BRIEF DESCRIPTION OF THE DRAWINGS

FIG. 9 illustrates formation of hexahedral elements in a three dimensional body in accordance with the present invention.

DETAILED DESCRIPTION OF THE INVENTION

Figure 1:
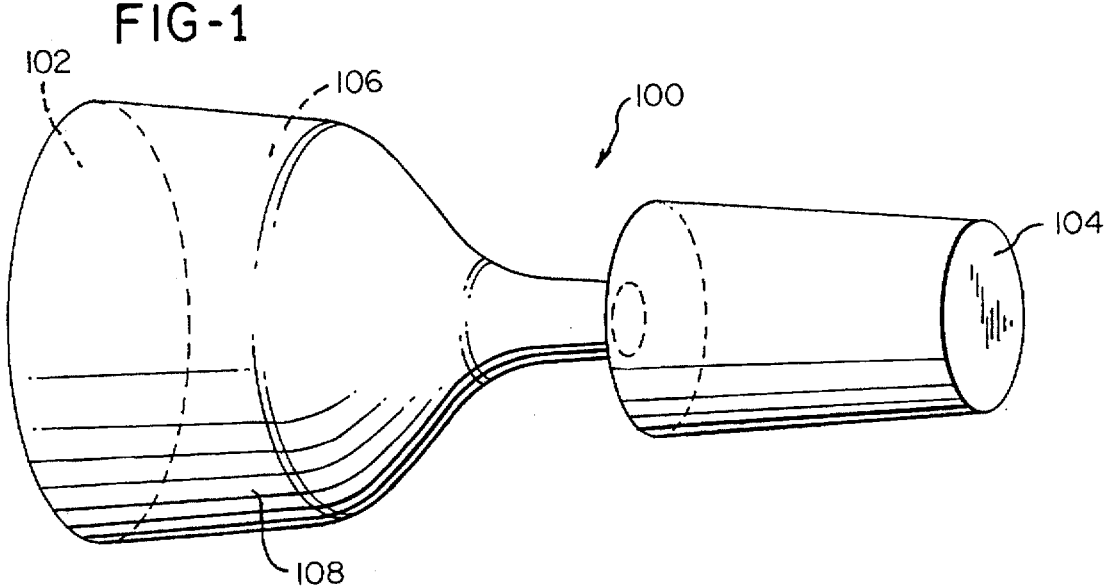
FIG. 1 illustrates a solid model of a three dimensional body which is to be analyzed using finite element analysis and will be used to illustrate the invention of the present application.

The invention of the present application will now be described with reference to the drawings wherein FIG. 1 illustrates a solid model of an intake passage 100 of an internal combustion engine. The intake passage 100 receives a valve V, see FIG. 9, therein for controlling the opening and closing of the passage. The solid model, for example of the intake passage 100, is generated using any one of a number of commercially available computer aided design (CAD) software packages. CAD packages which can be used in the present invention include SDRC-IDEAS, ARIES, ComputerVision and the like as will be apparent to those skilled in the art.

Figure 2:
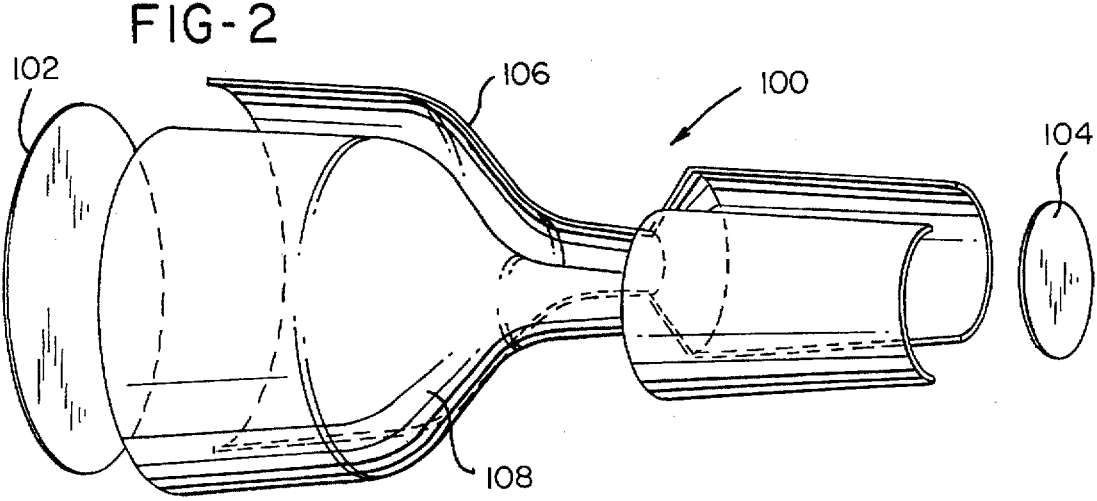
FIG. 2 illustrates the selection of bounding surfaces for use in the invention of the present application.

Bounding surfaces are next manually selected. As shown in FIG. 2, four bounding surfaces 102, 104, 106, 108 were selected for the solid model of the intake passage 100. As illustrated, the two circular bounding surfaces 102, 104 were picked separately and the hourglass outer surface interconnecting the bounding surfaces 102, 104 was selected and then split into two halves, i.e., halved, which is the preferred method of division.

An inlet surface and an outlet surface are then selected from the bounding surfaces 102, 104, 106, 108. For meshing in accordance with the present invention, the body is viewed as a passage through which fluid flows in across the inlet surface and out across the outlet surface. The remaining surfaces of the body are considered to be solid walls through which fluid flow is not possible with regard to the potential flow problem. Fluid velocities are prescribed, for example unit velocity can be selected across the inlet surface and the velocity across the outlet surface will be that required to conserve mass.

While it is not always obvious as to which bounding surfaces to select as the inlet surface and the outlet surface, for the intake passage 100, the bounding surface 102 was selected as the inlet surface and the bounding surface 104 was selected as the outlet surface. The general rule for selecting inlet and outlet surfaces is that the flow between the inlet and outlet surfaces will be as regular as possible which should lead to the best mesh quality.

Figure 3:
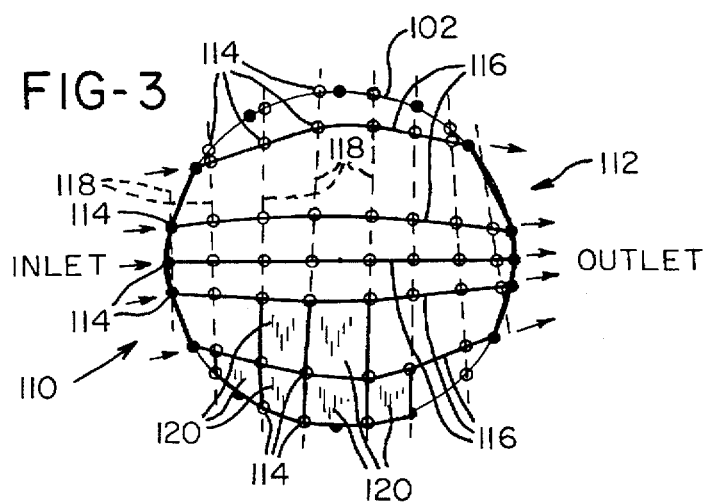
FIGS. 3–5 illustrate discretization and potential flow analysis as performed on the bounding surfaces of FIG. 2 for use in the invention of the present application.
Figure 4:
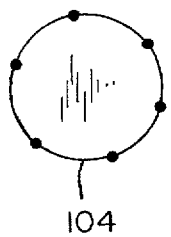
Figure 5:
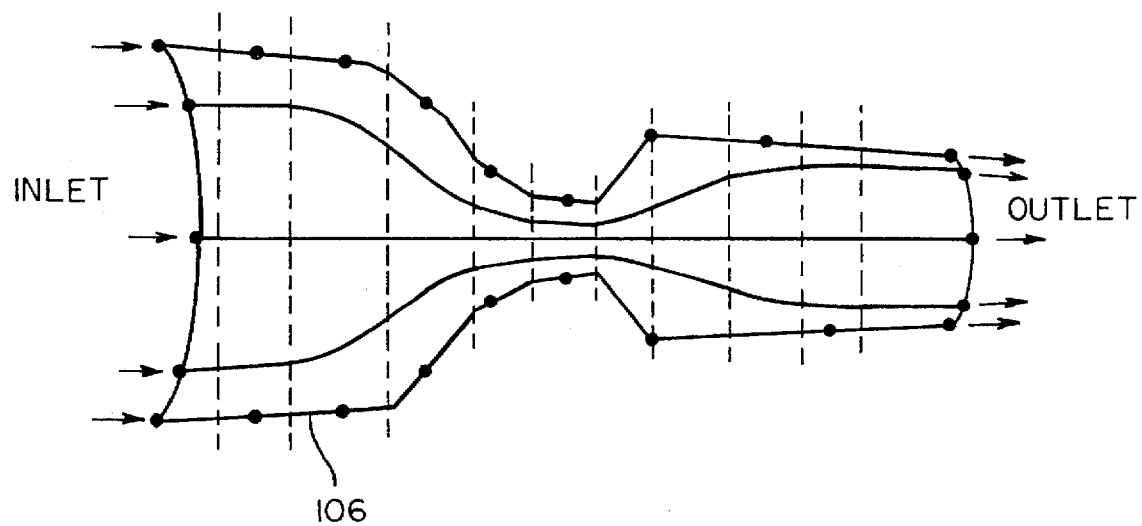

Next, the edges of at least the selected inlet bounding surface 102 are discretized as indicated by the dots located thereon, see FIG. 3. The discretization can be performed manually or by using one of several available edge discretization algorithms such as those found in PATRAN. In any event, edge discretization is trivial since it is one dimensional. For sake of illustration, the edges of the bounding surfaces 102, 104, 106 have been discretized, see FIGS. 3–5; however, this is not necessary as will become apparent.

The essence of the invention of the present application will now be described relative to the selected inlet boundary surface 102. This description generalizes the invention with regard to two dimensional applications and is also the first step in three dimensional applications. After the edges of the selected inlet boundary surface 102 have been discretized, an inlet end 110, indicated by a heavy line, and an outlet end 112, also indicated by a heavy line, are assigned to form boundary conditions for analysis of the inlet boundary surface 102. For meshing purposes in accordance with the invention of the present application, the inlet surface 102 is viewed as a passage through which fluid flows in across the inlet end 110 and out across the outlet end 112. The remaining edges of the inlet surface 102 are considered to be solid walls through which fluid flow is not possible with regard to the potential flow problem. Fluid velocities are prescribed, for example unit velocity can be selected across the inlet end and the velocity across the outlet end will be that required to conserve mass.

Here again, the selection of the inlet end 110 and the outlet end 112 is arbitrary since they will not matter to the solution of the resulting potential flow problem which will be solved to form inlet nodes 114 on the inlet surface 102. The general rule for selecting inlet and outlet ends is that the flow between the inlet and outlet ends will be as regular as possible which should lead to the best mesh quality. However, the actual selection will be problem and surface dependent.

Once the edge discretization and boundary conditions have been defined, the potential flow problem from the inlet end 110 to the outlet end 112 of the inlet boundary surface 102 is solved using the boundary element method (BEM) which may be performed using one of a number of commercially available software packages such as VSAERO, COMET or BEASY. Of course, if desired, users can write their own solver code.

A general approach to formulating a potential problem using the boundary element method will now be described. The boundary element method is used by several software packages including those just mentioned and is also found in several textbooks including, for example *Boundary Elements—An Introductory Course*, Brebbia & Dominguez, CMP and McGraw Hill, 1989.

Any flow can be described by a velocity potential ($\phi$) whose gradient is the velocity (v), i.e.: For internal flow problems, represented by flow in any solid enclosed volume, the potential equation of equation 1 satisfies the Laplace's equation:

$$\nabla^2 \phi = 0 \text{ in } V \tag{2}$$

where V is the domain of interest.

Applying Green's theorem to Equation 2, $$4\pi\phi(p) - \int_S \phi \frac{\partial}{\partial n}\left(\frac{1}{r}\right) dS = -\int_S \frac{1}{r} \frac{\partial \phi}{\partial n} dS + \int_V \frac{1}{r}(\nabla^2 \phi) dV \tag{3}$$

where S is the boundary of domain V; n is the surface normal at a point (node) or the "source"; p is a point inside V or the "doublet"; and, r is the distance from the source to the doublet. The volume integral on the right hand side of the equation is required only when an exact treatment of compressibility is required. This integral is ignored for the purposes of the invention of the present application. Therefore, the only integrals appearing in equation (3) are surface (or boundary) integrals.

The boundary conditions are specified at points of known velocities, inlets and outlets as illustrated. The known velocities are broken into components parallel and normal to the surface. As illustrated, normal velocities ($\partial \phi/\partial n$) are specified at the inlets and outlets and the normal velocities on all other surfaces are specified to be zero, i.e., fluid is allowed to slip along these surfaces. Magnitudes are chosen by the user. For example, the magnitude of the velocity at the inlet can be unity, i.e. 1.0. The magnitude at the outlet then becomes equal to the ratio of the areas of cross section of the outlet to the inlet to conserve mass.

The surface S of the domain V is now divided into several "elements" and the potential within each element is described by a local series expansion:

$$\phi = \phi_o + \phi_x x' + \phi_y y' + O(x^2) \tag{4}$$

Substitution of these expansion equations for $\phi$ and its derivative into Equation 3 results in the following equation:

$$4\pi\phi_o - \sum^{NEL} \left\{ \phi_o \int \frac{\partial}{\partial n}\left(\frac{1}{r}\right) dS + \phi_x \int x' \frac{\partial}{\partial n}\left(\frac{1}{r}\right) dS + \phi_y \int y' \frac{\partial}{\partial n}\left(\frac{1}{r}\right) dS \ldots \right\} = \tag{5}$$

$$\sum^{NEL} \left\{ \left(\frac{\partial \phi}{\partial n}\right)_o \int \left(\frac{1}{r}\right) dS + \left(\frac{\partial \phi}{\partial n}\right)_x \int \left(\frac{1}{r}\right) dS + \left(\frac{\partial \phi}{\partial n}\right)_y \int y' \left(\frac{1}{r}\right) dS \ldots \right\}$$

where NEL is the number of elements.

The integrals in the above equations are performed numerically, e.g., by Gaussian integration, for each surface element. Equation 5 leads to a system of simultaneous equations with the body potential distribution $\phi_k$ as the unknown:

$$[LHS]\{\phi_k\} = \{RHS\} \tag{6}$$

where LHS and RHS refer to the left-hand-side and right-hand-side of the equation respectively. The matrix on the left hand side is formed from a re-arrangement of the terms in Equation 5 and is referred to as the matrix of "influence" coefficients. The matrix on the right hand side is formed from the specified velocities on the boundary.

Once $\phi_k$ in Equation 6 are determined, the streamlines are computed as will now be described. The numerical procedure for calculating streamline paths is based on finite intervals, with a mean velocity being calculated in the middle of each interval.

The velocity calculation point, $\vec{RP}$, is obtained by extrapolation from the two previous intervals on the basis of constant rate of change in the velocity vector direction, i.e.:

$$\vec{RP} = \vec{R}_n + 0.5 \, s_n \vec{t} \tag{7}$$

where $\vec{R}_n$ is the previous point calculated on the streamline, $s_n$, is the present interval length, and $\vec{t}$ is a projected tangent vector.

$$\vec{t} = \left(\frac{S_n + S_{n-1}}{S_{n-2} + S_{n-1}}\right)(\vec{t}_{n-1} - \vec{t}_{n-2}) + \vec{t}_{n-1} \tag{8}$$

$$\text{where } \vec{t}_{n-1} = \frac{\vec{V}_{n-1}}{|\vec{V}_{n-1}|}, \text{ etc.}$$

$\vec{V}_{n-1}$ is the velocity calculated in the middle of the previous interval.

$\vec{RP}$ does not necessarily lie on the streamline path. The calculated velocity, $\vec{V}_n$, at $\vec{RP}$ is used to evaluate the next point on the streamline, i.e.:

$$\vec{R}_{n+1} = \vec{R}_n + \frac{S_n \vec{V}_n}{|\vec{V}_n|} \tag{9}$$

Additional information regarding this procedure can be obtained by reference to the manuals which accompany the noted software packages, for example, from the VSAERO user's manual.

In any event, operation of selected solver code results in velocity vectors within the flow pattern from the inlet end 110 to the outlet end 112 of the inlet bounding surface 102. Streamlines 116 are then obtained using the same solver code by post-processing the velocity vectors to find lines everywhere tangential to the velocity vectors. The streamlines 116 are referred to herein as two dimensional streamlines since they are used to develop quadrilaterals for the two dimensional inlet bounding surface 102.

There are two critical features of the streamlines which are derived from the boundary method that need to be mentioned. First, the streamlines "cover" all the space on the surface between the inlet and the outlet. That is, if the inlet region had been discretized so finely, the streamlines emanating from it would cover the entire surface before exiting from the outlet. Second, no two streamlines can ever intersect each other. This is a property of solving for potential flow. As a result, the streamlines will cover the surface completely without any overlap.

Figure 6:
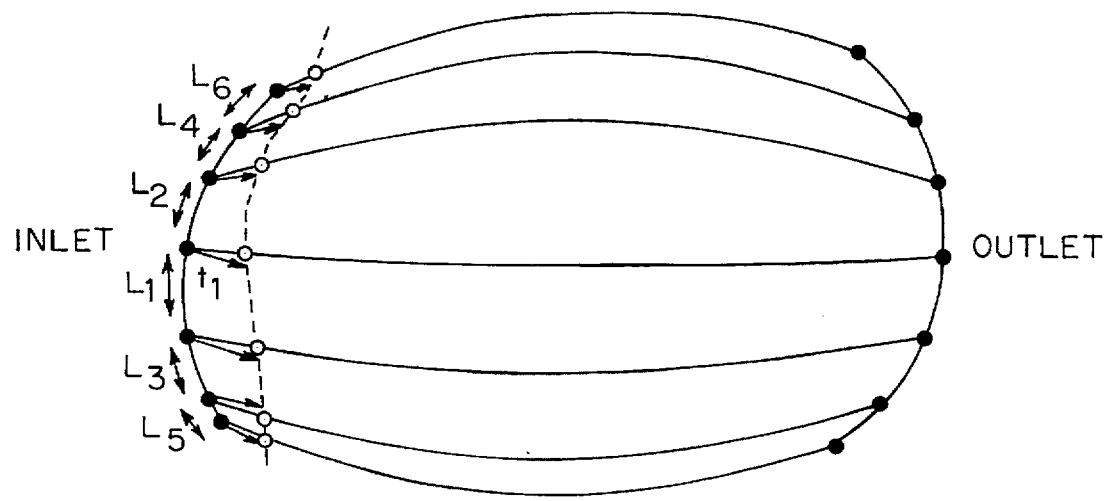
FIG. 6 illustrates the generation of grid lines in a two dimensional meshing operation of the present invention or as an initial step in a three dimensional meshing operation.

Each node on the inlet end 110 of the inlet bounding surface 102 has one of the two dimensional streamlines 116 originating from it and flowing to the outlet end 112 of the inlet bounding surface 102. A series of dashed grid lines 118 are defined generally transverse to the two dimensional streamlines 116 with the grid lines being progressively spaced from the inlet end 102 to the outlet end 104 of the inlet bounding surface 102. The spacing of the grid lines is based on an average distance $t_i$ of the line segments $L_i$ connected to the nodes on the inlet end 110 of the inlet bounding surface 102. For example, as shown in FIG. 6, $t_1=(L_1+L_2)/2$ with the remaining average distances being similarly calculated. This averaging process ensures a reasonable aspect (height to width) ratio of mesh element size, i.e., it prevents very skinny elements from forming adjacent to larger elements. The points of intersection of the grid lines 118 with the streamlines 116 determine the interior inlet nodes 114 on the inlet surface 102.

Figure 8:
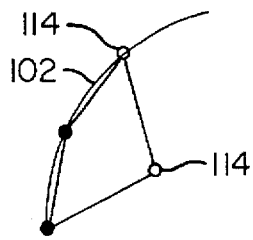
FIG. 8 is a portion of the inlet surface 102 of FIG. 3 illustrating a two dimensional quadrilateral mesh which may initially appear as a triangular mesh element.
Figure 10:
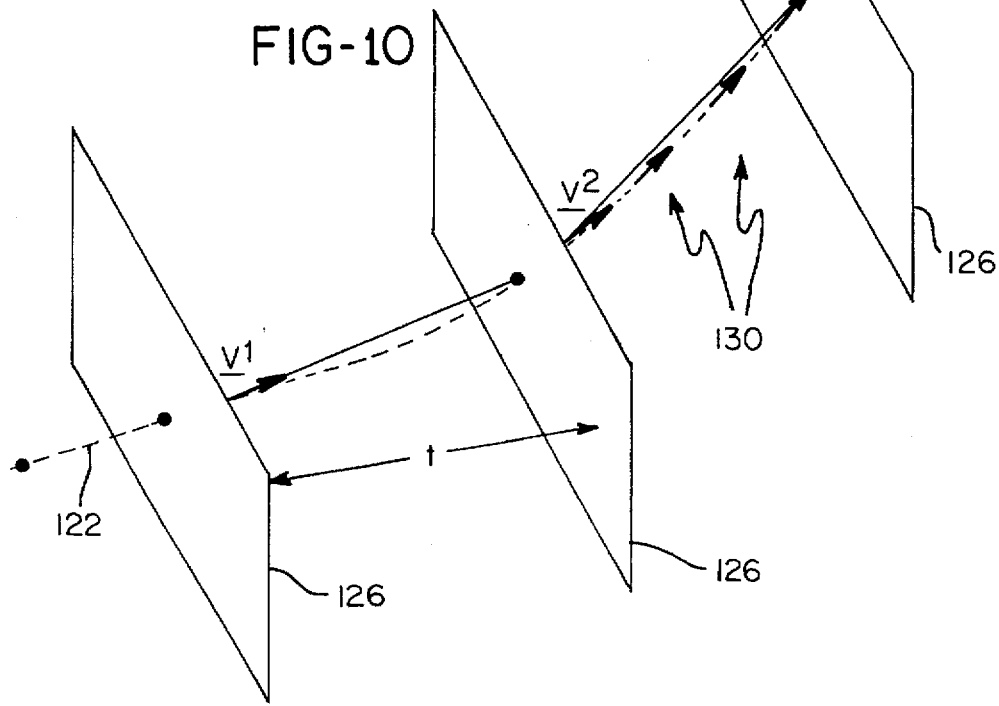
FIG. 10 illustrates sub-incrementing in the formation of grid planes for a three dimensional mesh generation in accordance with the present invention.

Quadrilaterals 120 covering the inlet surface 102 are then formed by connecting the nodes as shown in FIG. 3. While some of the resulting mesh elements may not appear to be quadrilateral, in fact they are as shown in FIG. 8. The description to this point illustrates how quadrilateral mesh elements are formed in accordance with the present invention for a two dimensional mesh. This two dimensional mesh production also serves as the first step in generation of hexahedral mesh elements for three dimensional bodies as will now be described.

After the inlet surface 102 has been processed as described above to be partitioned into quadrilateral mesh elements 120, meshing of the three dimensional body, for example the intake passage 100, can progress. As noted earlier, the bounding surface 104 is selected as the outlet surface for the intake passage 100. A three dimensional potential flow problem from the inlet surface 102 to the outlet surface 104 is next solved using the boundary element method (BEM) which is performed again using one of a number of commercially available software packages such as VSAERO, COMET, BEASY or a user-supplied code. Each node on the inlet surface 102 has a three dimensional streamline 122 as shown in FIG. 9 associated with it with regard to flow through the intake passage 100 as indicated by flow arrows 124.

Figure 7:
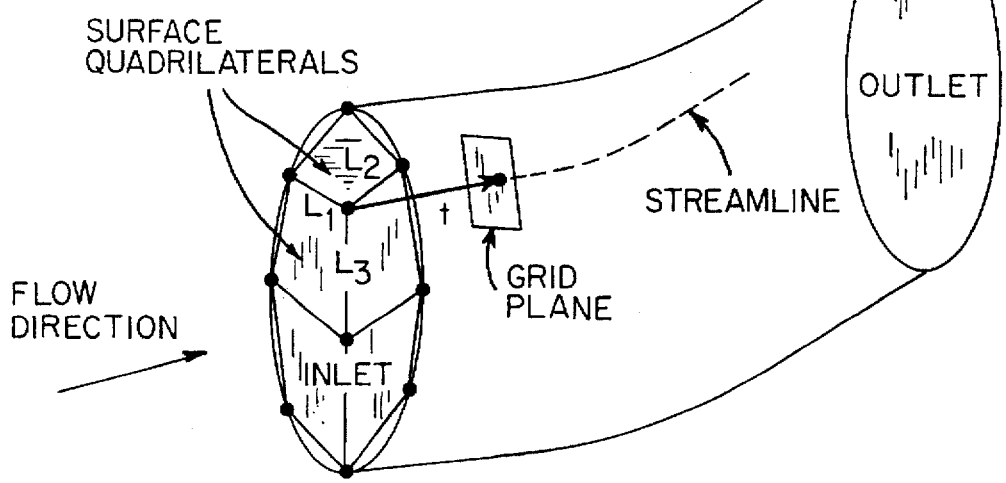
FIG. 7 illustrates the generation of grid planes in a three dimensional meshing operation of the present invention.

To preserve a good aspect ratio (height/width) for hexahedra to be generated, an average distance is traversed along each streamline using the equation:

$$t = \frac{1}{n} \sum_{j=1}^{n} L_i \qquad (7)$$

wherein n is the number of lines meeting at the node and L is the length of the lines meeting at the node, see FIG. 7. This procedure is repeated for each node on the inlet bounding surface 102 to produce a grid plane 126 which in effect is a translation of the inlet plane or inlet bounding surface 102 along the streamlines 122. The grid plane generation procedure is then repeated for each grid plane 126 to define a series of grid planes 126 which are generally transverse to the three dimensional streamlines and progressively spaced from the inlet surface 102 to the outlet surface 104.

After the grid planes 126 have been determined, the point of intersection of each streamline 122 with the grid planes 126 can be located by traversing along the streamlines 122. These points of intersection define flow nodes 128. The streamlines 122 can have high curvature in some instances such that sub-incrementing 130 may need to be employed. For such instances, the sub-incrementing is built into the computation of the streamlines and does not have to be employed explicitly by the mesh generator. Instead, the increments used by the streamline generator can be used to determine the locations of the flow nodes. For additional information regarding sub-incrementation, the reader is referred to the manuals which accompany the software packages used for streamline generation, for example, reference can be made to the theory manual of VSAERO. In any event, the sub-incrementing simply takes small steps along the streamlines 122 to account for curvature of the streamlines.

For three dimensional mesh generation, hexahedra are built by connecting neighboring nodes to form quadrilaterals on each grid plane and these quadrilaterals are connected to quadrilaterals on neighboring grid planes to form hexahedra, such as a hexahedra 132 as shown in FIG. 9. This hexahedra forming procedure is continued until the entire solid model is filled with hexahedra.

Having thus described the invention of the present application in detail and by reference to preferred embodiments thereof, it will be apparent that modifications and variations are possible without departing from the scope of the invention defined in the appended claims.

What is claimed is:

1. A method for producing a mesh of hexahedral elements for a body to be analyzed using finite element analysis comprising the steps of:

generating a solid model of a body to be analyzed; defining bounding surfaces of said body;

selecting an inlet surface and an outlet surface from said bounding surfaces for said body;

discretizing edges of said inlet surface of said body;

assigning an inlet end and an outlet end for said inlet surface;

solving for the potential flow from said inlet end to said outlet end for said inlet surface;

computing inlet streamlines for potential flows from said inlet end to said outlet end for said inlet surface;

defining a series of inlet grid lines which are generally transverse to said inlet streamlines and progressively spaced from said inlet end of said inlet surface to said outlet end of said inlet surface;

defining inlet nodes where said grid lines intersect said inlet streamlines and said edges of said inlet surface outside of said inlet end of said inlet surface;

building quadrilaterals by connecting said inlet nodes to one another;

solving for the potential flow from said inlet surface to said outlet surface for said body;

computing solid streamlines for potential flows from said inlet nodes of said inlet surface to said outlet surface;

defining a series of grid planes which are generally transverse to said solid streamlines and progressively spaced from said inlet surface to said outlet surface;

defining flow nodes where said solid streamlines intersect said grid planes and said outlet surface; and connecting said inlet nodes and said flow nodes to define hexahedra elements for said body.

2. A method for producing a mesh of elements for a body to be analyzed using finite element analysis comprising the steps of:

generating a model of a body to be analyzed, said body having at least one surface;

discretizing edges of said at least one surface;

assigning an inlet end and outlet end for said at least one surface;

solving for the potential flow from said inlet end to said outlet end for said at least one surface;

computing two dimensional streamlines for potential flows from said inlet end to said outlet end for said at least one surface;

defining a series of grid lines which are generally transverse to said two dimensional streamlines and progressively spaced from said inlet end of said at least one surface to said outlet end of said at least one surface;

defining nodes where said grid lines intersect said two dimensional streamlines and said edges of said at least one surface outside of said inlet end of said at least one surface; and building quadrilaterals by connecting said nodes to one another.

3. A method for producing a mesh of elements for a body to be analyzed using finite element analysis as claimed in claim 2 wherein said body is a three dimensional body and further comprising the steps of:

defining bounding surfaces of said body, said bounding surfaces including said at least one surface;

selecting said at least one surface as an inlet surface for said body;

selecting an outlet surface from remaining bounding surfaces for said body;

solving for the potential flow from said inlet surface to said outlet surface for said body;

computing three dimensional streamlines for potential flows from said nodes of said inlet surface to said outlet surface;

defining a series of grid planes which are generally transverse to said three dimensional streamlines and progressively spaced from said inlet surface to said outlet surface;

defining flow nodes where said three dimensional streamlines intersect said grid planes and said outlet surface; and connecting said nodes of said inlet surface and said flow nodes to define hexahedra elements for said body.

* * * * *